United States Patent
Inaoka et al.

(10) Patent No.: US 11,708,171 B2
(45) Date of Patent: Jul. 25, 2023

(54) POWER DISTRIBUTION SYSTEM AND POWER DISTRIBUTION METHOD

(71) Applicant: MITSUBISHI HEAVY INDUSTRIES, LTD., Tokyo (JP)

(72) Inventors: Takaki Inaoka, Tokyo (JP); Yasuto Minamida, Tokyo (JP); Manabu Yamamoto, Aichi (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 29 days.

(21) Appl. No.: 17/632,704

(22) PCT Filed: Aug. 17, 2020

(86) PCT No.: PCT/JP2020/031024
§ 371 (c)(1),
(2) Date: Feb. 3, 2022

(87) PCT Pub. No.: WO2021/038475
PCT Pub. Date: Mar. 4, 2021

(65) Prior Publication Data
US 2022/0281612 A1 Sep. 8, 2022

(30) Foreign Application Priority Data
Aug. 26, 2019 (JP) ................. 2019-153703

(51) Int. Cl.
*B64D 31/14* (2006.01)
*B64D 27/24* (2006.01)
(Continued)

(52) U.S. Cl.
CPC ............ *B64D 31/14* (2013.01); *B64D 27/24* (2013.01); *B64D 47/00* (2013.01);
(Continued)

(58) Field of Classification Search
None
See application file for complete search history.

(56) References Cited

U.S. PATENT DOCUMENTS

| 2013/0065090 A1 | 3/2013 | Kazuno et al. |
| 2015/0123622 A1 | 5/2015 | Yasui |

(Continued)

FOREIGN PATENT DOCUMENTS

| EP | 3 309 952 | 4/2018 |
| JP | 61-81132 | 4/1986 |

(Continued)

OTHER PUBLICATIONS

Extended European Search Report dated Nov. 3, 2022 in corresponding European Patent Application No. 20859118.0.

(Continued)

*Primary Examiner* — Jared Fureman
*Assistant Examiner* — Aqeel H Bukhari
(74) *Attorney, Agent, or Firm* — Wenderoth, Lind & Ponack, L.L.P.

(57) ABSTRACT

A power distribution system 100 is installed in an aircraft, and comprises: a first DC power supply unit 10 including a generator 11; a second DC power source unit 20 including a battery 30, a step-up/down converter 41, a voltage sensor 43, and control unit 44; and a diode 50. When the voltage sensor 43 does not detect regenerative power, the control unit 44 executes a running power processing mode in which generated power generated by the first DC power supply unit 10 is supplied to an electric actuator 80 while charging and discharging the battery 30 using the step-up/down converter 41 so as to keep a charge rate A of the battery 30 within a predetermined range. When the voltage sensor 43 detects regenerative power, the control unit 44 executes a regenerative power processing mode in which the battery 30 is (Continued)

charged with the regenerative power using the step-up/down converter 41.

7 Claims, 10 Drawing Sheets

(51) Int. Cl.
  *B64D 47/00*  (2006.01)
  *H02J 7/14*  (2006.01)
  *H02J 7/00*  (2006.01)
  *H02J 1/10*  (2006.01)
  *H02M 3/158*  (2006.01)

(52) U.S. Cl.
  CPC ........ *H02J 7/00304* (2020.01); *H02J 7/1438* (2013.01); *H02J 7/1492* (2013.01); *B64D 2221/00* (2013.01); *H02J 1/102* (2013.01); *H02J 2310/44* (2020.01); *H02M 3/1582* (2013.01)

(56) References Cited

U.S. PATENT DOCUMENTS

| | | | |
|---|---|---|---|
| 2015/0183385 A1* | 7/2015 | Iwashima | B60R 16/03 307/9.1 |
| 2020/0290742 A1* | 9/2020 | Kumar | B64D 27/24 |

FOREIGN PATENT DOCUMENTS

| | | |
|---|---|---|
| JP | 2015-112002 | 6/2015 |
| JP | 2017-5944 | 1/2017 |
| JP | 2019-122122 | 7/2019 |
| WO | 2013/015791 | 1/2013 |
| WO | 2018/047224 | 3/2018 |

OTHER PUBLICATIONS

International Search Report dated Sep. 24, 2020 in International (PCT) Application No. PCT/JP2020/031024.
Written Opinion of the International Searching Authority dated Sep. 24, 2020 in International (PCT) Application No. PCT/JP2020/031024, with English-language translation.

* cited by examiner

POWER DISTRIBUTION SYSTEM AND POWER DISTRIBUTION METHOD

TECHNICAL FIELD

The present invention relates to a power distribution system and a power distribution method.

BACKGROUND ART

In the related art, there is a technique relating to a power distribution system of an electrified aircraft in which most of power systems are electric systems. For example, PTL 1 discloses a power supply system for an electrified aircraft that has a first DC power supply unit including a generator and a PWM converter, and a second DC power supply unit including a battery and a step-up converter, and exchanges electric power between the first DC power supply unit, the second DC power supply unit, and an actuator via a DC bus. In this power supply system, the share of the power supply stabilization operation is adjusted in each of the first DC power supply unit and the second DC power supply unit.

PTL 2 discloses a power distribution device for an electrified aircraft including a central switchboard connected to a generator and a remote switchboard connected to the central switchboard and an electric actuator. This power distribution device is provided with a power storage device, and the regenerative power generated by the electric actuator can be output to the power storage device by the remote switchboard. A switch (relay) that cuts off a current equal to or more than a predetermined value is provided between the electric actuator and the remote switchboard.

CITATION LIST

Patent Literature

[PTL 1] Japanese Unexamined Patent Application Publication No. 2017-005944
[PTL 2] Japanese Unexamined Patent Application Publication No. 2015-112002

SUMMARY OF INVENTION

Technical Problem

In the power supply system described in PTL 1, in a case where regenerative power is generated by the actuator, the regenerative power is shared and processed between the first DC power supply unit and the second DC power supply unit. However, for example, in a case where the first DC power supply unit includes a plurality of generators in order to improve reliability, processing for the regenerative power in the first DC power supply unit becomes complicated. In a case where steep regenerative power is generated, the responsiveness in the first DC power supply unit is problematic. Since the regenerative power is processed by the first DC power supply unit and the second DC power supply unit via the DC bus, voltage fluctuations occur in the DC bus during processing, and other electrical equipment connected to the DC bus may be influenced by the voltage fluctuations.

In the power distribution device disclosed in PTL 2, although the power storage device can be charged with regenerative power generated by the actuator, a power storage rate of the power storage device is not taken into consideration. Therefore, in a case where the power storage rate of the power storage device becomes too high, the regenerative power may not be processed by the power storage device. When the power storage device is overcharged, this leads to deterioration of the power storage device.

The present invention has been made in view of the above circumstances, and an object thereof is to provide a power distribution system that can process regenerative power generated by an electric actuator of an aircraft with good responsiveness and stably, and can prevent voltage fluctuations of a DC bus during processing of the regenerative power.

Solution to Problem

In order to solve the above problem and to achieve the object, according to the present invention, there is provided a power distribution system that is mounted on an aircraft and distributes electric power to an electric actuator of the aircraft, the power distribution system including a first DC power supply unit that has a generator and is connected to a DC bus; a second DC power supply unit that has a power line connected to the DC bus and the electric actuator, a power storage device connected to the power line, a charge/discharge control circuit controlling charging and discharging of the power storage device, a detection sensor detecting the presence or absence of regenerative power supplied from the electric actuator to the power line, and a control unit controlling the charge/discharge control circuit; and a diode that cuts off a current flowing from the second DC power supply unit to the DC bus, in which when the detection sensor does not detect the regenerative power, the control unit executes a running electric power processing mode in which generated electric power that is generated by the first DC power supply unit is supplied to the electric actuator via the DC bus and the power line while charging and discharging the power storage device such that a storage rate of the power storage device is maintained within a predetermined range by the charge/discharge control circuit, and when the detection sensor detects the regenerative power, the control unit executes a regenerative power processing mode in which the power storage device is charged with the regenerative power by the charge/discharge control circuit.

With this configuration, the regenerative power generated by the electric actuator is processed to be stored in the power storage device without using the first DC power supply unit having the generator as a power source. Therefore, it is possible to improve the processing responsiveness of the regenerative power and cope with the steep generation of the regenerative power. By cutting off a current flowing from the second DC power supply unit to the DC bus with the diode, a voltage of the DC bus does not fluctuate during processing of the regenerative power. In a case where the electric actuator does not generate regenerative power, that is, in a case where the electric actuator is supplied with electric power, the power storage device is charged and discharged such that the storage rate is maintained within a predetermined range. As a result, when the regenerative power is generated by the electric actuator, it is possible to suppress that the regenerative power cannot be processed or the power storage device is overcharged because the storage rate A of the power storage device is too high. Therefore, according to the power distribution system of the present invention, the regenerative power generated by the electric actuator of the aircraft can be processed in a stable manner with good responsiveness, and the voltage fluctuation of the DC bus can be prevented during the processing of the regenerative power.

Preferably, in the running electric power processing mode, in a case where the storage rate is equal to or higher than a first storage rate, the control unit continues a power running assist mode in which electric power from the power storage device is supplied to the electric actuator in addition to the generated electric power until the storage rate becomes lower than a second storage rate that is lower than the first storage rate, and in a case where the electric power storage rate is lower than the second storage rate, continues a charging mode in which the power storage device is charged with part of the generated electric power until the storage rate becomes equal to or higher than the first storage rate.

With this configuration, the storage rate of the power storage device can be maintained within a predetermined range between the first storage rate and the second storage rate while the electric power is being supplied to the electric actuator. As a result, when the regenerative power is generated by the electric actuator, it is possible to suppress that the regenerative power cannot be processed or the power storage device is overcharged because the storage rate A of the power storage device is too high. The storage rate of the power storage device can be sufficiently maintained, and electric power can be supplied from the power storage device to the electric actuator with a margin. In a case where the storage rate is equal to or higher than the first storage rate, the power running assist mode is continued until the storage rate becomes lower than the second storage rate, and in a case where the storage rate is lower than the first storage rate, the constant current charging mode is continued until the storage rate becomes equal to or higher than the second storage rate. Consequently, it is possible to prevent frequent switching between the power running assist mode and the constant current charging mode.

Preferably, when the first DC power supply unit cannot be used normally, the control unit executes an emergency electric power processing mode in which electric power is exchanged between the power storage device and the electric actuator while the power storage device is charged and discharged by the charge/discharge control circuit.

With this configuration, even in a case where electric power cannot be exchanged between the first DC power supply unit and the electric actuator, electric power can be supplied from the second DC power supply unit to the electric actuator and regenerative power from the electric actuator can be processed by the second DC power supply unit. As described above, since the storage rate A of the power storage device is maintained within a predetermined range while supplying electric power from the first DC power supply unit to the electric actuator, it is possible to prevent the electric power from the power storage device from being insufficient in the emergency electric power processing mode.

Preferably, when the detection sensor is brought into a state of not detecting the regenerative power during execution of the regenerative power processing mode, the control unit continues the regenerative power processing mode until a predetermined standby time elapses, and transitions to the running electric power processing mode in a case where the state in which the detection sensor does not detect the regenerative power continues for a predetermined standby time.

With this configuration, it is possible to suppress frequent switching between the regenerative power processing mode and the running electric power processing mode.

The second DC power supply unit preferably includes an overcurrent cutoff circuit that cuts off a connection with the electric actuator when a current with a predetermined value or more flows for a predetermined time or more.

With this configuration, for example, when a short circuit occurs on the electric actuator side, it is possible to suppress an overcurrent from flowing into the power distribution system and suppress a voltage drop in the DC bus.

Preferably, in the second DC power supply unit, a plurality of electric actuators are connected in parallel to the power line, and the overcurrent cutoff circuit is provided in correspondence to each of the electric actuators.

With this configuration, part of the regenerative power generated by one electric actuator can be supplied to another electric actuator. As a result, it is possible to reduce an electric power loss that may occur in the charge/discharge control circuit and when charging the power storage device compared with a case where the power storage device is charged with the whole of the regenerative power, and thus it is possible to improve the electric power efficiency. Particularly, in the emergency electric power processing mode, in a case where there is the electric actuator that is not required to be driven, when the corresponding overcurrent cutoff circuit is turned off, the electric power is suppressed from being supplied from the battery to the electric actuator. Therefore, it is possible to suppress a decrease in the storage rate of the battery.

In order to solve the above problem and to achieve the object, according to the present invention, there is provided a power distribution method of distributing electric power from a power distribution system that is mounted on an aircraft to an electric actuator of the aircraft, the power distribution system including a first DC power supply unit that has a generator and is connected to a DC bus, a second DC power supply unit that has a power line connected to the DC bus and the electric actuator, a power storage device connected to the power line, a charge/discharge control circuit controlling charging and discharging of the power storage device, and a detection sensor detecting the presence or absence of regenerative power supplied from the electric actuator to the power line, and a diode that cuts off a current flowing from the second DC power supply unit to the DC bus, the power distribution method including a running electric power processing mode step of supplying, when the detection sensor does not detect the regenerative power, generated electric power that is generated by the first DC power supply unit to the electric actuator via the DC bus and the power line while charging and discharging the power storage device such that a storage rate of the power storage device is maintained within a predetermined range by the charge/discharge control circuit; and a regenerative power processing mode step of charging, when the detection sensor detects the regenerative power, the power storage device with the regenerative power by the charge/discharge control circuit.

With this configuration, the regenerative power generated by the electric actuator is processed to be stored in the power storage device without using the first DC power supply unit having the generator as a power source. Therefore, it is possible to improve the processing responsiveness of the regenerative power and cope with the steep generation of the regenerative power. By cutting off a current flowing from the second DC power supply unit to the DC bus with the diode, a voltage of the DC bus does not fluctuate during processing of the regenerative power. In a case where the electric actuator does not generate regenerative power, that is, in a case where the electric actuator is supplied with electric power, the power storage device is charged and discharged such that the storage rate is maintained within a predetermined range. As a result, when the regenerative power is generated by the electric actuator, it is possible to suppress that the regenerative power cannot be processed or the power storage device is overcharged because the storage rate A of the power storage device is too high. Therefore, according to the power distribution method of the present invention, the regenerative power generated by the electric actuator of the aircraft can be processed in a stable manner with good responsiveness, and the voltage fluctuation of the DC bus is prevented during processing of the regenerative power.

DESCRIPTION OF EMBODIMENTS

Hereinafter, embodiments of a power distribution system and a power distribution method according to the present invention will be described in detail with reference to the drawings. The present invention is not limited to these embodiments.

Figure 1:
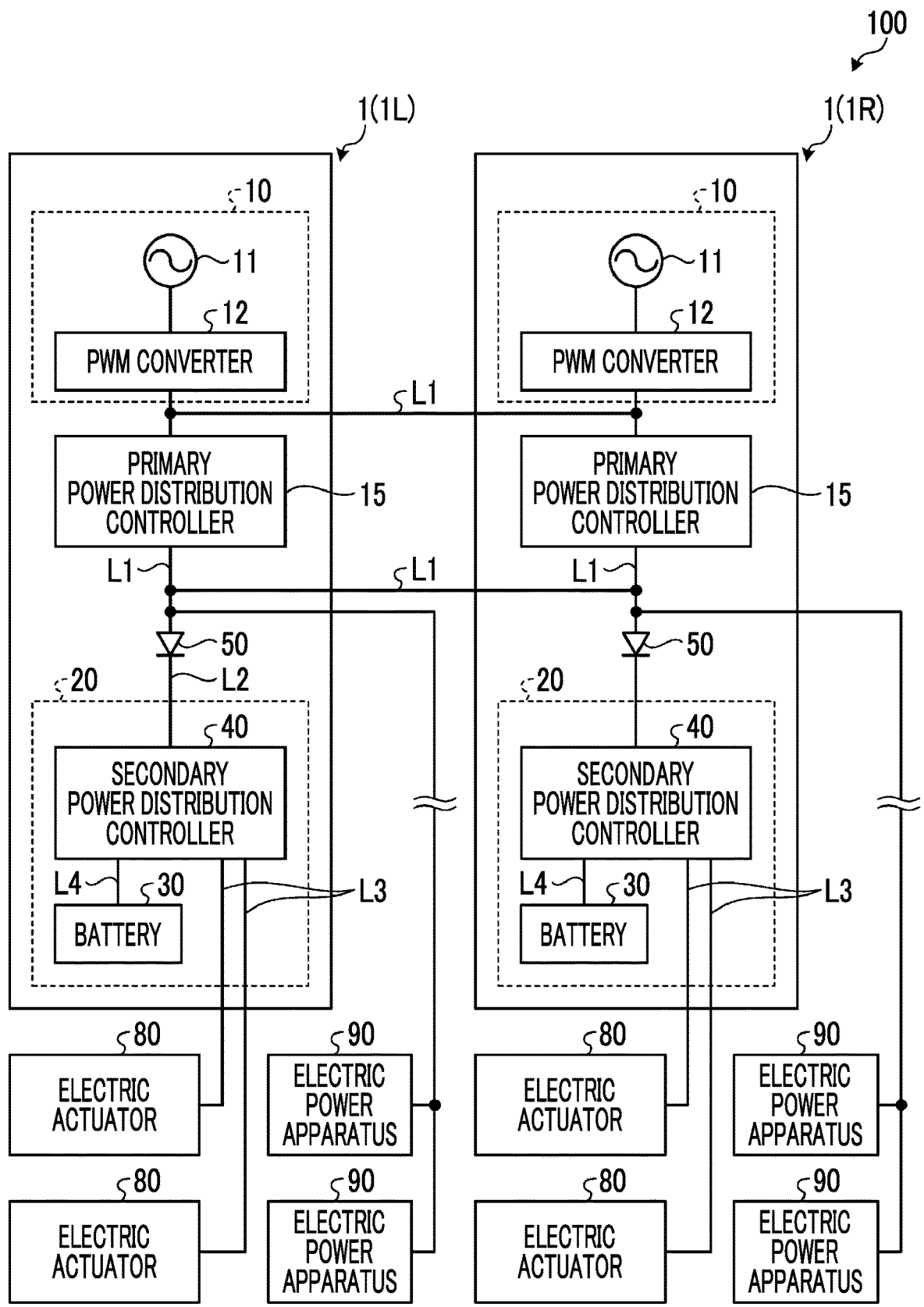
FIG. 1 is an explanatory diagram illustrating an example of a configuration of a power distribution system according to an embodiment.

FIG. 1 is an explanatory diagram illustrating an example of a configuration of a power distribution system according to an embodiment. The power distribution system 100 according to the embodiment is mounted on an aircraft (electrified aircraft) of which most of power systems (a hydraulic system, an electric system, bleed air system, and the like) are electric systems, and distributes electric power to a plurality of electric actuators 80 of the aircraft. As illustrated in FIG. 1, the aircraft is provided with a plurality of electric power apparatuses 90 in addition to the electric actuators 80. The plurality of electric power apparatuses 90 are connected to a DC bus L1 of the power distribution system 100. The power distribution system 100 also supplies electric power to the plurality of electric power apparatuses 90 via the DC bus L1.

In the present embodiment, the electric actuators 80 are actuators for controlling flight control surfaces provided on wings of the aircraft. The actuator for controlling the flight control surface may generate regenerative power when the flight control surface receives an external force of air resistance during flight of the aircraft. The electric actuator 80 is not limited to controlling the flight control surface, and may be an actuator for driving any device as long as the actuator can generate regenerative power. For example, the electric actuator 80 may be one used for a driving machine for driving vehicle wheels.

In the present embodiment, the power distribution system 100 has a plurality of power distribution sections 1. That is, as illustrated in FIG. 1, the power distribution system 100 includes a power distribution section 1L and a power distribution section 1R. Since the power distribution sections 1L and 1R have fundamentally the same configuration, in a case where it is not necessary to distinguish between the power distribution sections 1L and 1R, the power distribution sections 1L and 1R will be simply referred to as the power distribution section 1.

As illustrated in FIG. 1, the power distribution section 1 includes a first DC power supply unit 10, a second DC power supply unit 20, and a diode 50. The power distribution section 1 may further include an emergency DC power supply unit that exchanges electric power with the electric actuator 80 when the first DC power supply unit 10 does not function normally. The emergency DC power supply unit may be connected to the DC bus L1 and supply electric power to the electric actuator 80 via the second DC power supply unit 20.

The first DC power supply unit 10 includes a generator 11 and a PWM converter 12. The generator 11 functions as an alternating power supply that generates electricity by power from an engine (not illustrated) of the aircraft. The PWM converter 12 is connected to the generator 11 and converts AC generated power generated by the generator 11 into DC generated power. The PWM converter 12 is connected to the DC bus L1 and supplies DC power with a constant voltage (270 V in the present embodiment) to the DC bus L1. A voltage VL1 of the DC bus L1 may be detected by a voltage sensor 13 (refer to FIG. 2). As illustrated in FIG. 1, the electric power with a constant voltage generated by the PWM converter 12 is distributed to each constituent in the power distribution system 100, such as the second DC power supply unit 20 and a power distribution controller (not illustrated) connected to the plurality of electric power apparatuses 90 by the primary power distribution controller 15 via the DC bus L1. As illustrated in FIG. 1, the power distribution sections 1L and 1R are connected to each other via the DC bus L1 on the downstream side of the PWM converter 12 and the downstream side of the primary power distribution controller 15. Consequently, the power distribution sections 1L and 1R can mutually use electric power generated by the first DC power supply unit 10.

The second DC power supply unit 20 includes a battery (power storage device) 30 and a secondary power distribution controller 40. The battery 30 is a well-known storage battery capable of storing electric power, such as a lithium ion storage battery. The second DC power supply unit 20 is not limited to the battery 30, and may be any one provided with a power storage device such as a capacitor that can store electric power. A plurality of power storage devices may be provided, or a plurality of sets of different power storage devices may be combined and configured. In the present embodiment, the power distribution system 100 includes a voltage sensor 14 that detects a voltage between terminals of the battery 30 and a current sensor 16 that detects a charge/discharge current of the battery 30.

The secondary power distribution controller 40 is connected to the DC bus L1 via a power line L2. However, as illustrated in FIG. 1, a diode 50 is provided between the power line L2 and the DC bus L1. An anode side of the diode 50 is connected to the DC bus L1 and a cathode side thereof is connected to the power line L2. Therefore, the diode 50 cuts off a current flowing from the second DC power supply unit 20 to the DC bus L1. The secondary power distribution controller 40 is connected in parallel to the respective electric actuators 80 via a plurality of power lines L3. The secondary power distribution controller 40 is connected to the battery 30 via the power line L4. In the present embodiment, as an example, two electric actuators 80 are connected in parallel to the second DC power supply unit 20, but three or more electric actuators 80 may be connected in parallel, and at least one electric actuator 80 may be connected.

The electric power generated by the first DC power supply unit 10 and distributed by the primary power distribution controller 15 is supplied to the secondary power distribution controller 40 via the DC bus L1. The secondary power distribution controller 40 supplies the generated electric power from the first DC power supply unit 10 and the electric power stored in the battery 30 to each electric actuator 80. The secondary power distribution controller 40 charges the battery 30 with the regenerative power generated by each electric actuator 80.

Figure 2:
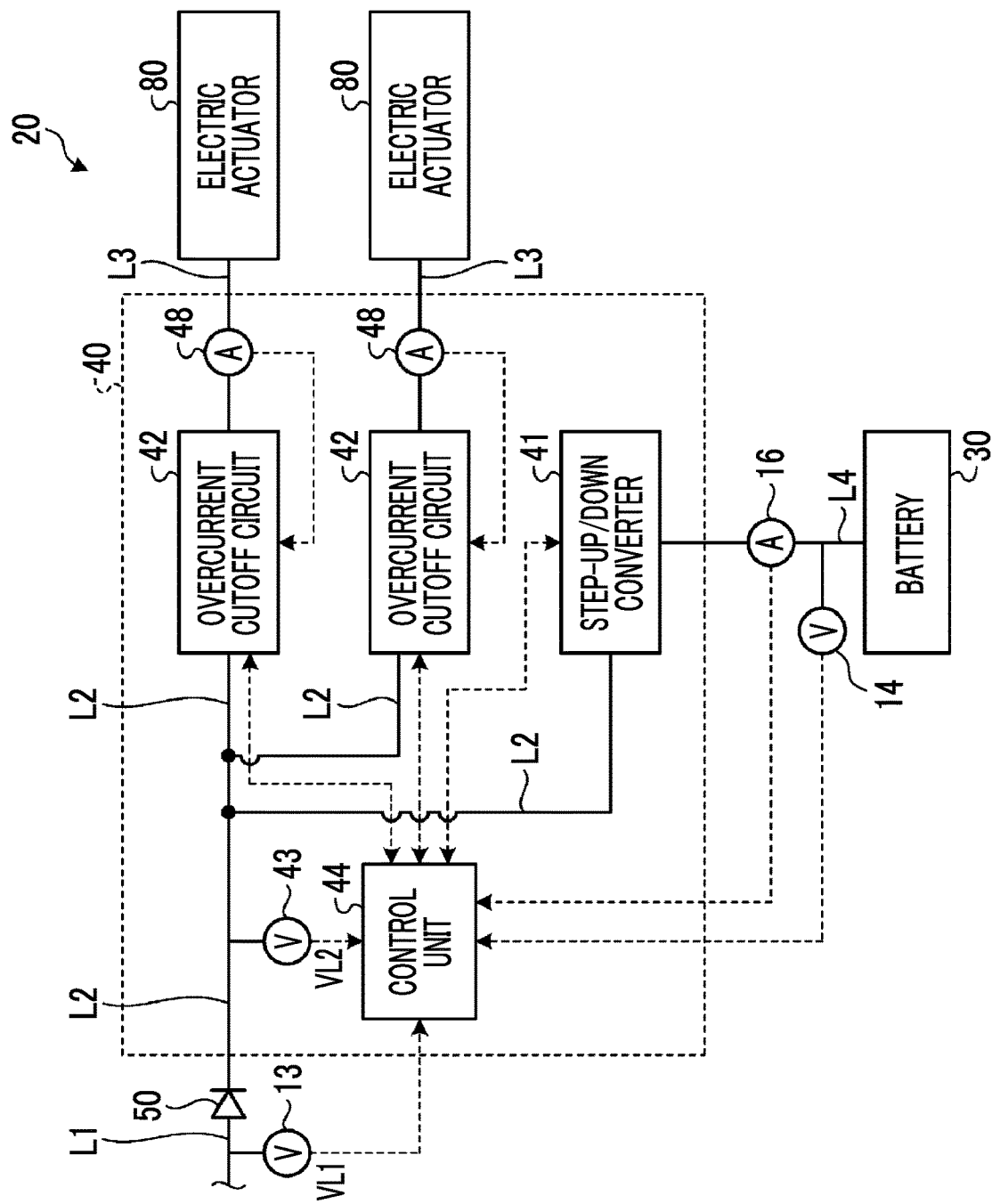
FIG. 2 is an explanatory diagram of an example of a configuration of a secondary power distribution controller.

A configuration of the secondary power distribution controller 40 will be described in more detail. FIG. 2 is an explanatory diagram of an example of the configuration of the secondary power distribution controller. As illustrated in FIG. 2, the secondary power distribution controller 40 includes a step-up/down converter 41, a plurality of overcurrent cutoff circuits 42, a voltage sensor 43, and a control unit 44.

The step-up/down converter 41 is a PWM converter provided between the power line L2 and the power line L4 and adjusts a voltage of the DC power exchanged between the power line L2 and the battery 30. The step-up/down converter 41 functions as a charge/discharge control circuit that controls charging and discharging of the battery 30.

Figure 3:
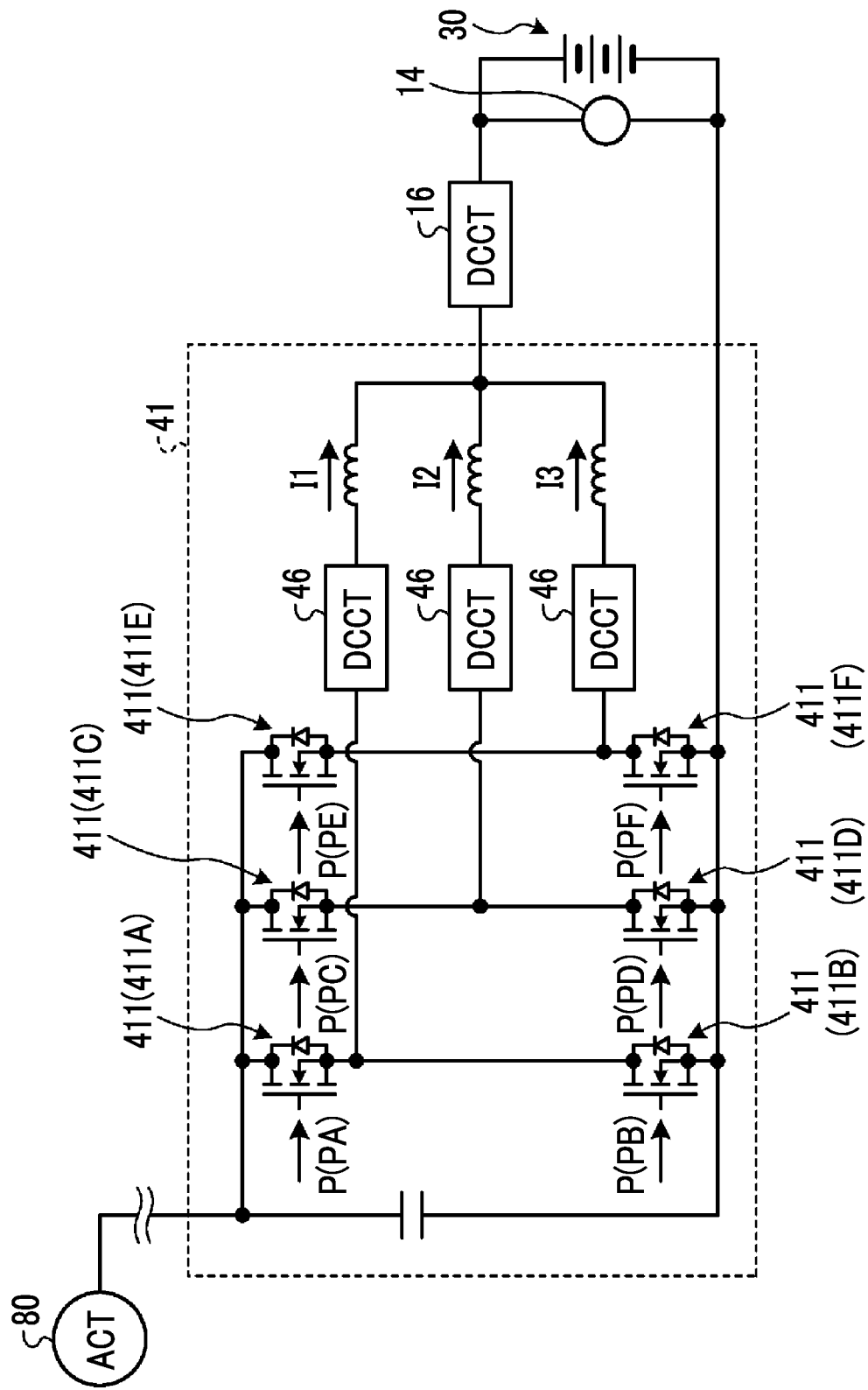
FIG. 3 is an explanatory diagram illustrating a step-up/down converter.

FIG. 3 is an explanatory diagram illustrating the step-up/down converter. The step-up/down converter 41 is a three-phase DC/DC converter including a plurality of switching elements 411 (411A, 411B, 411C, 411D, 411E, and 411F). The switching element 411 is a well-known switching element such as a MOSFET. The switching element 411 may be an IGBT or the like. The switching elements 411A and 411B, the switching elements 411C and 411D, and the switching elements 411E and 411F turn on and off a current flowing at each phase of the three-phase step-up/down converter 41. The step-up/down converter 41 is provided with a current sensor 46 that detects a current value at each phase. In the present embodiment, the step-up/down converter 41 shifts a phase of a voltage at each phase by 120° to perform switching, and then combines phases of currents at the respective phases. Consequently, a ripple of a waveform of an output voltage can be reduced. The step-up/down converter 41 is not limited to the three-phase type, and may be a single-phase type, a two-phase type, or a multi-phase type such as four or more phases.

The step-up/down converter 41 may step down the electric power of the power line L2 and supply the electric power to the battery 30 by turning on and off each switching element 411 in a predetermined switching cycle (for example, ¹⁄₄₀ kHz). The step-up/down converter 41 may step up the electric power from the battery 30 and supply the electric power to the power line L2 by turning on and off each switching element 411 in a predetermined switching cycle. Each switching element 411 of the step-up/down converter 41 is controlled by the control unit 44.

One overcurrent cutoff circuit 42 is provided between the power line L2 and the power line L3 in correspondence to each electric actuator 80. The overcurrent cutoff circuit 42 is a switch circuit capable of cutting off a current when a current of a predetermined value or more flows through the power line L3 for a predetermined time or longer. As illustrated in FIG. 2, the power line L3 is provided with a current sensor 48 that detects a current value. The current value detected by the current sensor 48 is input to the overcurrent cutoff circuit 42. The overcurrent cutoff circuit 42 cuts off a connection between each electric actuator 80 and the second DC power supply unit 20 in a case where the current value detected by the current sensor 48 is equal to or larger than a predetermined value for a predetermined time or longer. In addition to turning-on and off on the basis of the current value detected by the current sensor 48, in a case where the overcurrent cutoff circuit 42 is turned on/off at any timing, the overcurrent cutoff circuit 42 is controlled by the control unit 44.

The voltage sensor 43 is a sensor that detects a voltage VL2 of the power line L2. The voltage VL2 of the power line L2 detected by the voltage sensor 43 is output to the control unit 44. In the present embodiment, the voltage sensor 43 functions as a detection sensor that detects the presence or absence of regenerative power supplied from the electric actuator 80 to the power line L2.

The control unit 44 is, for example, an arithmetic processing unit configured with a central processing unit (CPU) or the like. As illustrated in FIG. 2, the voltage VL1 of the DC bus L1 detected by the voltage sensor 13 is input to the control unit 44. The control unit 44 determines whether or not the voltage VL1 is normal, that is, whether or not the first DC power supply unit 10 can be used normally, on the basis of the input value of the voltage VL1. Details of a process of determining whether or not the first DC power supply unit 10 can be used normally will be described later.

As illustrated in FIG. 2, the voltage VL2 of the power line L2 detected by the voltage sensor 43 is input to the control unit 44. The control unit 44 determines whether or not regenerative power is being supplied from the electric actuator 80 to the power line L2 on the basis of the input value of the voltage VL2. Details of a process of determining whether or not the regenerative power is being supplied from the electric actuator 80 to the power line L2 will be described later.

As illustrated in FIG. 2, the control unit 44 is connected to a voltage sensor 14 that detects a voltage between terminals of the battery 30 and a current sensor 16 that detects a charge/discharge current of the battery 30. The control unit 44 calculates a storage rate A of the battery 30 on the basis of the voltage between the terminals of the battery 30 input from the voltage sensor 14 and the charge/discharge current of the battery 30 input from the current sensor 16.

Information regarding temperatures detected by temperature detection sensors (not illustrated) in the step-up/down converter 41, the overcurrent cutoff circuit 42, and the battery 30 is input to the control unit 44. The control unit 44 has a communication portion (not illustrated), and is capable of communicating with the primary power distribution controller 15 via the communication portion.

Figure 4:
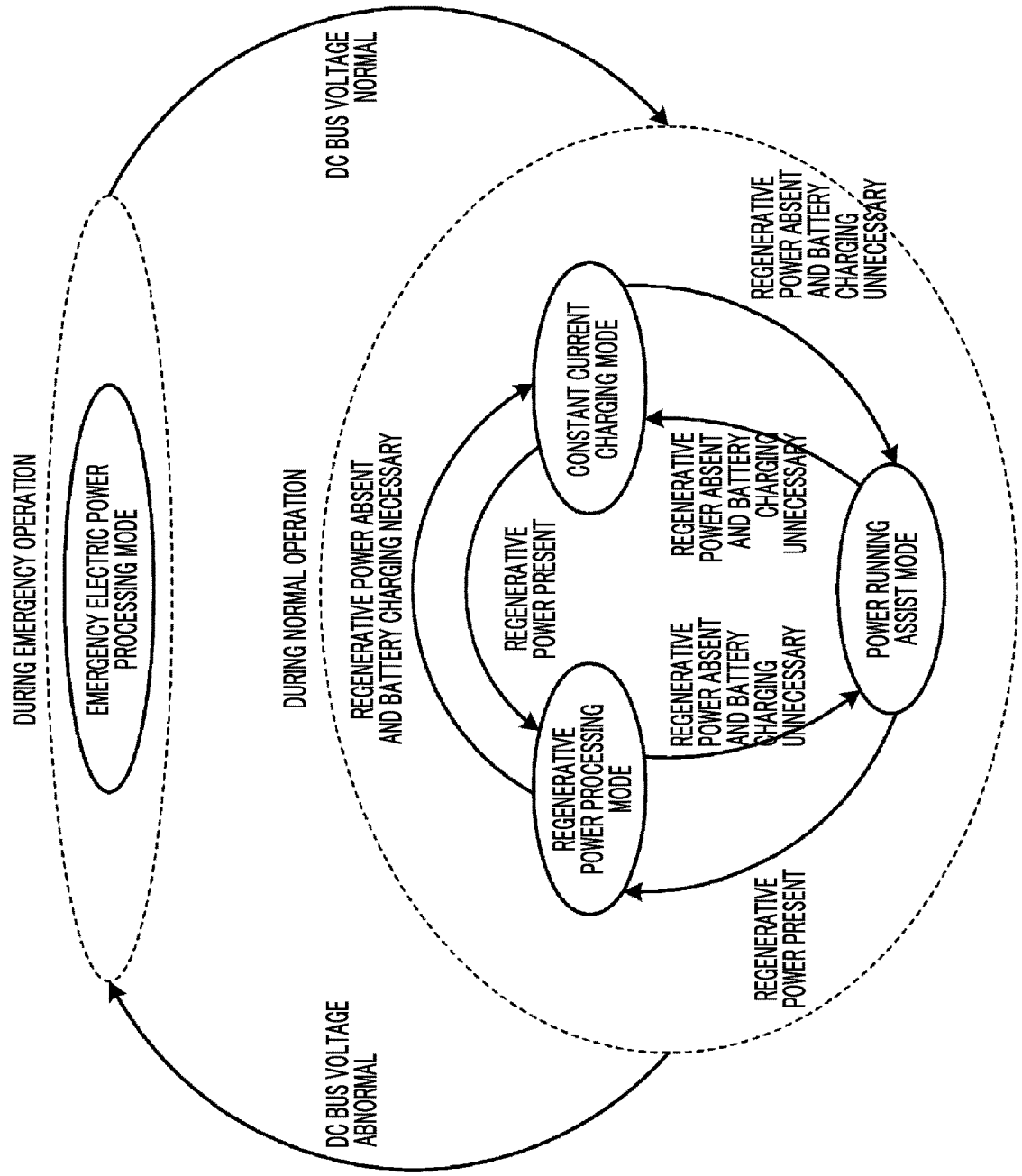
FIG. 4 is an explanatory diagram illustrating different electric power processing modes in the power distribution system according to the embodiment.

The control unit 44 is connected to the step-up/down converter 41. The control unit 44 generates a gate signal for turning on and off each switching element 411 of the step-up/down converter 41 in a predetermined switching cycle, and outputs the gate signal to each switching element 411. Consequently, a charge or discharge state of the battery 30 is controlled. As a result, the power distribution section may switch between a plurality of electric power processing modes for exchanging electric power between the electric actuator 80, the first DC power supply unit 10, and the second DC power supply unit 20. Hereinafter, each electric power processing mode will be described with reference to FIG. 4. FIG. 4 is an explanatory diagram illustrating different electric power processing modes in the power distribution system according to the embodiment.

As illustrated in FIG. 4, the power distribution section 1 executes a power running assist mode, a constant current charging mode (charging mode), and a regenerative power processing mode during a normal operation in which the first DC power supply unit 10 can be used normally, that is, when the voltage VL1 of the DC bus L1 is normal. The power running assist mode and the constant current charging mode are a part of a running electric power processing mode in which generated electric power that is generated by the first DC power supply unit 10 is supplied to a plurality of electric actuators 80 via the DC bus L1 and the power line L2 during a normal operation. During a normal operation, the voltage VL1 of the DC bus L1 is maintained to be a constant voltage (270 V in the present embodiment) by the electric power from the first DC power supply unit 10.

The power running assist mode is a mode in which, in addition to the generated electric power from the first DC power supply unit 10, the electric power stored in the battery 30 is supplied to the plurality of electric actuators 80. The control unit 44 controls the step-up/down converter 41 to supply the electric power from the battery 30 to the power line L2 at a current value set according to the required electric power.

The constant current charging mode is a mode in which the battery 30 is charged with part of the generated electric power from the first DC power supply unit 10 and the rest of the generated electric power is simultaneously supplied to the plurality of electric actuators 80. The control unit 44 controls the step-up/down converter 41 to charge the battery 30 with part of the generated electric power from the power line L2 at a predetermined constant current value (12 A in the present embodiment). The charging mode may be a mode in which the battery 30 is charged while changing a current value.

The regenerative power processing mode is a mode in which the battery 30 is charged with the generated regenerative power when the regenerative power is generated by the plurality of electric actuators 80 during a normal operation. The control unit 44 controls the step-up/down converter 41 to charge the battery 30 with the regenerative power from the power line L2. As described above, the diode 50 is provided between the second DC power supply unit 20 and the DC bus L1. Therefore, in a case where the regenerative power is generated by the plurality of electric actuators 80, the regenerative power does not flow to the DC bus L1 and the battery 30 can be charged under the control of the step-up/down converter 41.

The power distribution section 1 executes an emergency electric power processing mode as the electric power processing mode during an emergency operation in which the first DC power supply unit 10 cannot be used normally, that is, when the voltage VL1 of the DC bus L1 is abnormal. The emergency electric power processing mode is a mode in which electric power is exchanged between the battery 30 and the plurality of electric actuators 80 without using the first DC power supply unit 10. In a case where the first DC power supply unit 10 cannot be used normally, the constant voltage (270 V) will not be applied to the DC bus L1. In this case, the control unit 44 controls the step-up/down converter 41 to supply the electric power of the battery 30 to the electric actuator 80, and charge the battery 30 with the regenerative power from the electric actuator 80.

Figure 5:
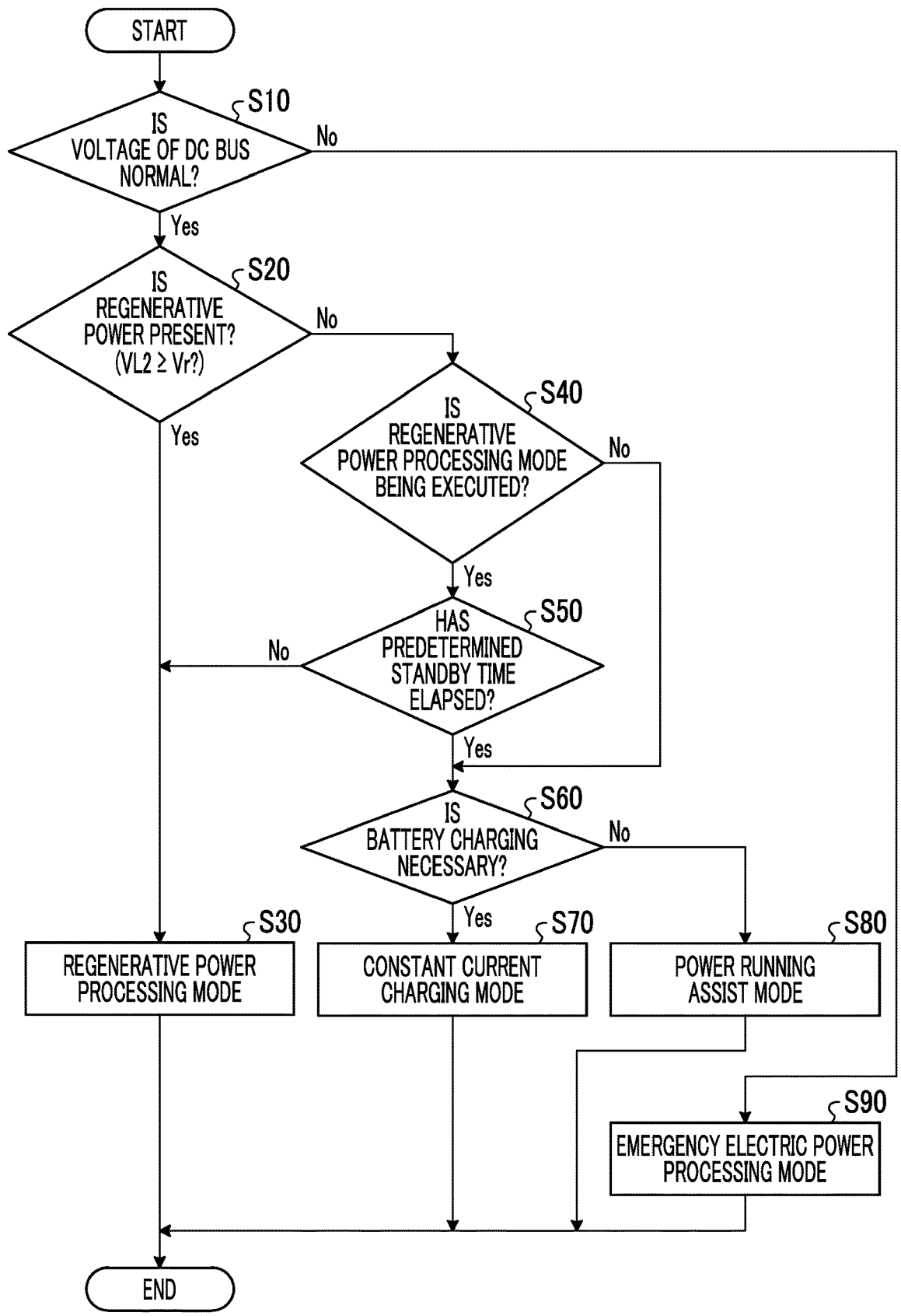
FIG. 5 is a flowchart illustrating an example of a procedure for switching between the respective electric power processing modes.

Next, a procedure for switching between the respective electric power processing modes as the power distribution method according to the embodiment will be described with reference to FIG. 5. FIG. 5 is a flowchart illustrating an example of a process of switching between the respective electric power processing modes. The flowchart of FIG. 5 is repeatedly executed by the control unit 44 at a predetermined time.

Figure 6:
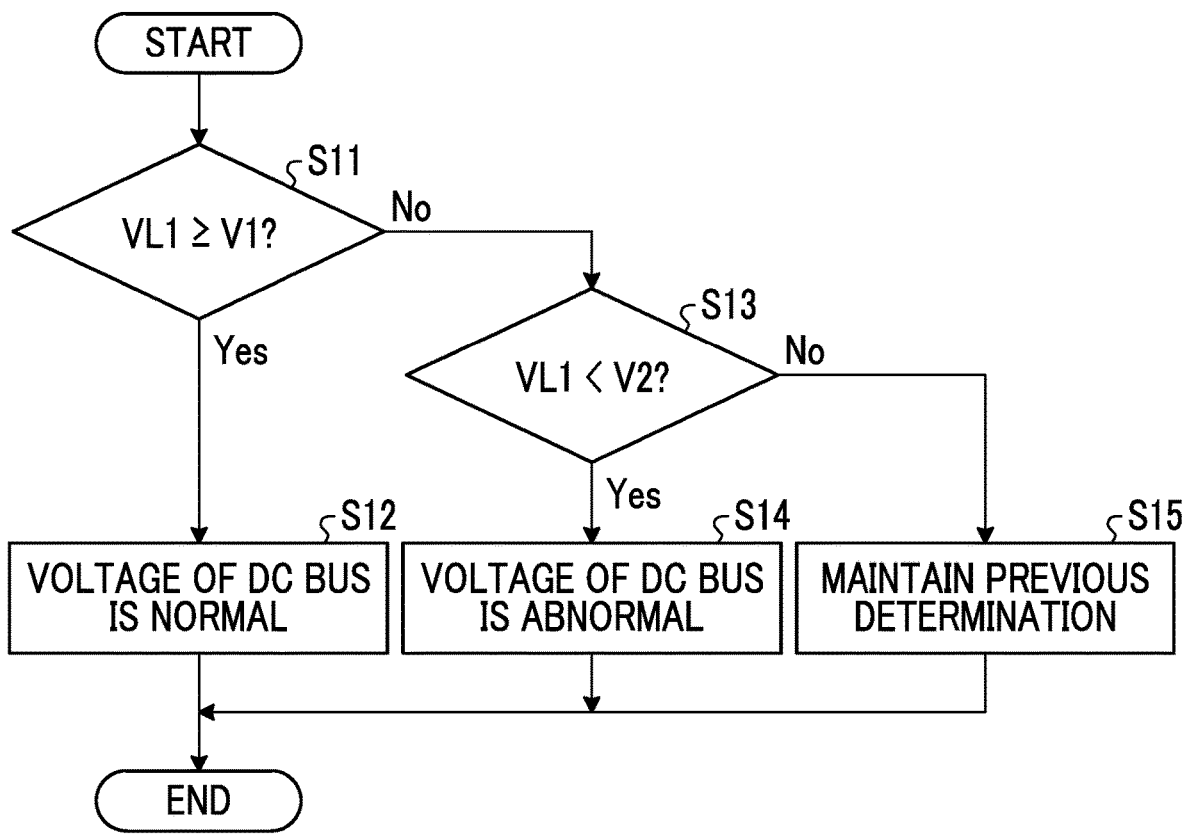
FIG. 6 is a flowchart illustrating an example of a procedure for determining whether or not a voltage of a DC bus is normal.
Figure 7:
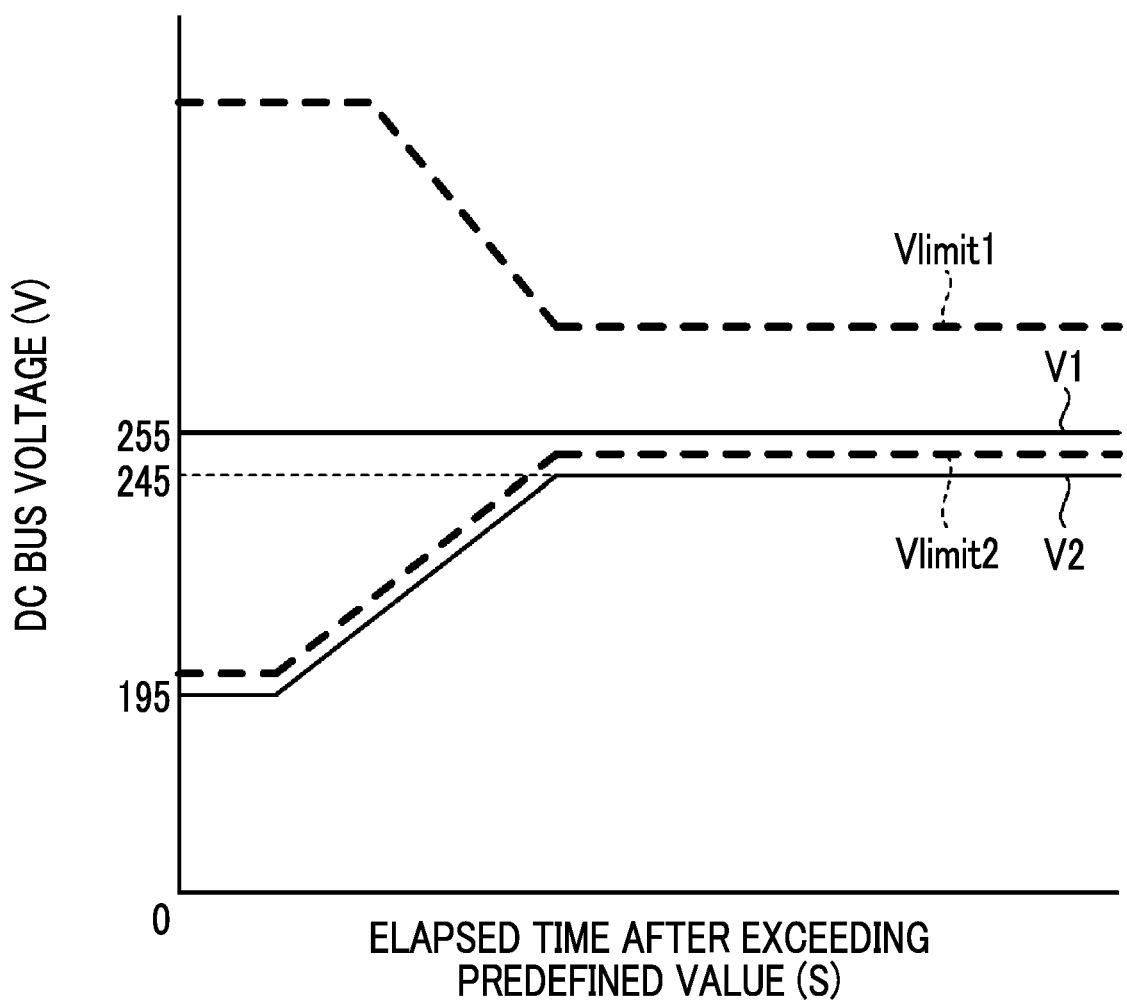
FIG. 7 is an explanatory diagram illustrating an example of a determination value for determining whether or not the voltage of the DC bus is normal.

In step S10, the control unit 44 determines whether or not the voltage VL1 of the DC bus L1 is normal. The control unit 44 inputs the voltage VL1 of the DC bus L1 from the voltage sensor 13, and determines the normality on the basis of a value of the input voltage VL1. FIG. 6 is a flowchart illustrating an example of a procedure for determining whether or not a voltage of the DC bus is normal. The flowchart of FIG. 6 is executed by the control unit 44. FIG. 7 is an explanatory diagram illustrating an example of a determination value for determining whether or not a voltage of the DC bus is normal. In FIG. 7, a vertical axis represents the voltage VL1 value of the DC bus L1, and a horizontal axis represents an allowable time at each voltage.

As illustrated in FIG. 6, first, the control unit 44 determines in step S11 whether or not the voltage VL1 is equal to or more than a first determination value V1. In the present embodiment, the first determination value V1 is a value between an upper limit value Vlimit1 and a lower limit value Vlimit2, which are predetermined as a voltage range of the DC bus L1, and is a value less than the voltage VL1 (for example, 270 V) of the DC bus L1 during a normal operation. The first determination value V1 is, for example, 255 V. In a case where it is determined that the voltage VL1 is equal to or more than the first determination value V1 (Yes in step S11), the control unit 44 proceeds to step S12 and determines that the voltage VL1 is normal.

On the other hand, in a case where it is determined that the voltage VL1 is less than the first determination value V1 (No in step S11), the control unit 44 proceeds to step S13 and determines whether or not the voltage VL1 is less than a second determination value V2. The second determination value V2 is smaller than the first determination value V1. Although FIG. 7 illustrates an example in which the second determination value V2 is smaller than the lower limit value Vlimit2, the second determination value V2 may be equal to or larger than the lower limit value Vlimit2. The second determination value V2 is, for example, 195 V to 245 V. In a case where it is determined that the voltage VL1 is less than the second determination value V2 (Yes in step S13), the control unit 44 proceeds to step S14 and determines that the voltage VL1 is abnormal.

In a case where it is determined that the voltage VL1 is equal to or more than the second determination value V2 (No in step S13), the control unit 44 proceeds to step S15 and maintains the previous determination. That is, when the voltage VL1 is brought into a state of being less than the first determination value V1 (No in step S11), it is determined that the voltage VL1 is normal until the voltage VL1 is brought into a state of being less than the second determination value V2 (Yes in step S13). Therefore, in a case where it is temporarily determined that the voltage VL1 is normal, the determination that the voltage VL1 is normal is continued unless the voltage VL1 decreases to less than the second determination value V2. When the voltage VL1 is brought into a state of being less than the second determination value V2 (Yes in step S13), it is determined that the voltage VL1 is abnormal until the voltage VL1 is brought into a state of being equal to or more than the first determination value V1 (Yes in step S11). Therefore, in a case where it is temporarily determined that the voltage VL1 is abnormal, the determination that the voltage VL1 is abnormal is continued unless the voltage VL1 recovers to the first determination value V1 or more.

FIG. 5 will be referred to again. In a case where it is determined that the voltage VL1 of the DC bus L1 is normal (Yes in step S10), the control unit 44 proceeds to step S20 and determines whether or not there is regenerative power from the electric actuator 80. More specifically, when the voltage VL2 of the power line L2 detected by the voltage sensor 43 is less than a preset threshold value Vr, the control unit 44 determines that there is no regenerative power, and when the voltage VL2 is equal to or more than the threshold value Vr, determines that there is regenerative power. The preset threshold value Vr is equal to the voltage VL2 (equal to the voltage VL1 of the DC bus L1; for example, 270 V) during a normal operation. The threshold value Vr is, for example, 275 V. When a voltage equal to or more than the threshold value Vr higher than the voltage VL2 during a normal operation (voltage VL1 during a normal operation) is generated in the power line L2, the electric actuator 80 supplies a current to the power line L2, and thus it may be determined that regenerative power is being generated.

In a case where it is determined that there is regenerative power from the electric actuator 80 (Yes in step S20), the control unit 44 proceeds to step S30 and executes the regenerative power processing mode (regenerative power processing mode step). The control unit controls the step-up/down converter 41 to charge the battery 30 with the regenerative power from the power line L4. In this case, as described above, the regenerative power from the electric actuator 80 is prevented from flowing to the DC bus L1 side by the diode 50. It is not necessary to charge the battery 30 with the whole of regenerative power generated by one electric actuator 80. That is, the battery 30 may be charged with part of the regenerative power generated by one electric actuator 80, and the rest of the regenerative power may be supplied to the other electric actuator 80.

On the other hand, in a case where it is determined that there is no regenerative power from the electric actuator 80 (No in step S20), the control unit 44 proceeds to step S40 and determines whether or not the regenerative power processing mode is being executed. In a case where it is determined that the regenerative power processing mode is not being executed (No in step S40), the control unit 44 proceeds to step S60. On the other hand, in a case where it is determined that the regenerative power processing mode is being executed (Yes in step S40), the control unit 44 proceeds to step S50 and determines whether or not a predetermined standby time has elapsed. The predetermined standby time starts to be counted from a timing at which it is first determined in step S20 that there is no regenerative power during the execution of the regenerative power processing mode. The predetermined standby time is reset in a case where it is determined in step S20 that there is regenerative power after the time counting is started once, and in a case where the flow proceeds to the processes in step S60 and the subsequent steps. The predetermined standby time is, for example, 150 msec.

In a case where it is determined that the predetermined standby time has not elapsed (No in step S50), the control unit 44 proceeds to step S30 and executes the regenerative power processing mode. Therefore, even if it is determined that the voltage VL2 is less than the threshold value Vr during the execution of the regenerative power processing mode, the regenerative power processing mode is continued until the predetermined standby time elapses. In a case where the voltage VL2 returns to a state of being equal to or more than the threshold value Vr (Yes in step S20) before the predetermined standby time elapses, the electric actuator 80 is in a state perform generating the regenerative power, and thus the execution of the regenerative power processing mode is continued (step S30). In this case, the predetermined standby time is reset as described above, and the time counting is started again from the timing at which it is first determined in step S20 that there is no regenerative power. Then, in a case where it is determined that the predetermined standby time has elapsed (Yes in step S50), the control unit 44 proceeds to step S60. That is, the control unit 44 proceeds to step S60 in a case where the state in which the voltage VL2 is less than the threshold value Vr continues for a predetermined standby time during the execution of the regenerative power processing mode.

Figure 8:
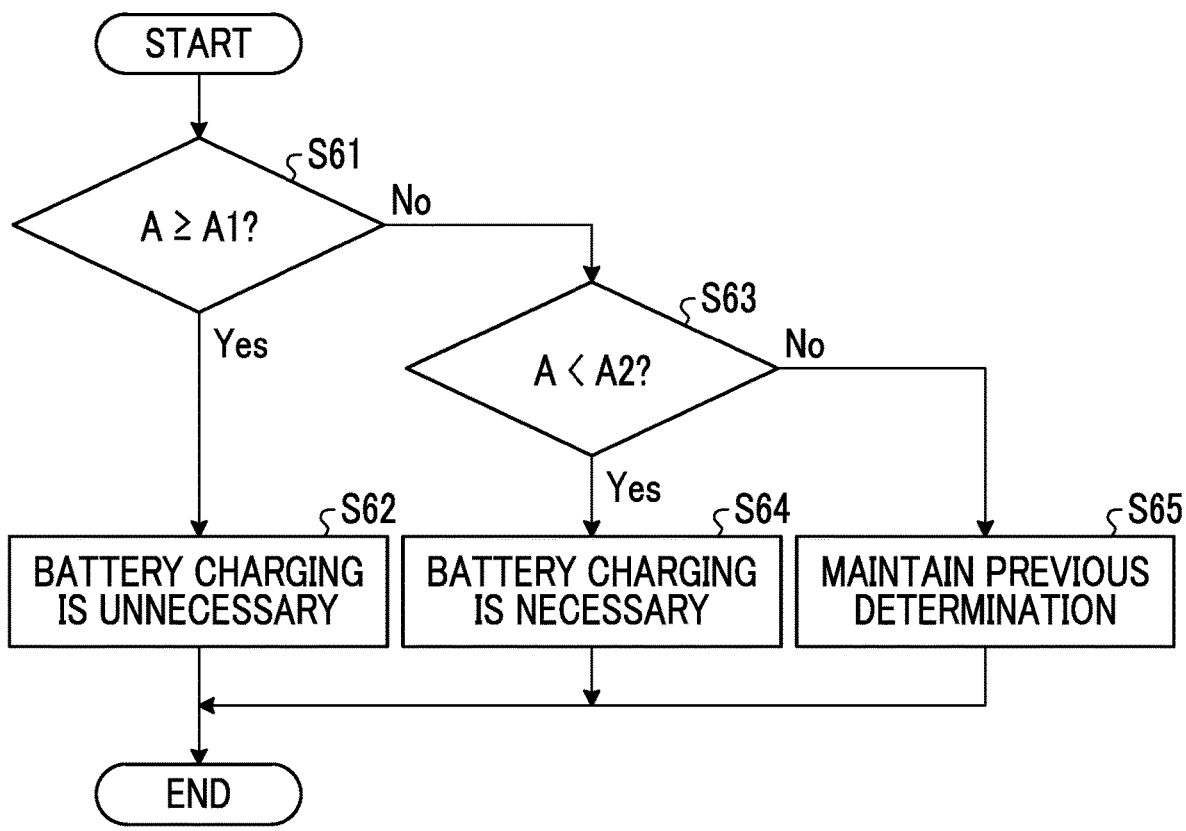
FIG. 8 is a flowchart illustrating an example of a procedure for determining whether or not a battery is required to be charged.

In step S60, the control unit 44 determines whether or not the battery 30 is required to be charged. FIG. 8 is a flowchart illustrating an example of a procedure for determining whether or not the battery is required to be charged. The flowchart illustrated in FIG. 8 is executed by the control unit 44. As illustrated in FIG. 8, first, the control unit 44 determines in step S61 whether or not the storage rate A of the battery 30 is equal to or higher than a first storage rate A1. As described above, the storage rate A of the battery 30 is calculated on the basis of a voltage between the terminals of the battery 30 and a charge/discharge current. The first storage rate A1 is a value at which the battery 30 is suppressed from being overcharged, and is set to, for example, 80%. In a case where it is determined that the storage rate A is equal to or higher than the first storage rate A1 (Yes in step S61), the control unit 44 proceeds to step S62 and determines that charging of the battery 30 is unnecessary.

On the other hand, in a case where it is determined that the storage rate A is less than the first storage rate A1 (No in step S61), the control unit 44 proceeds to step S63 and determines whether or not the storage rate A is lower than a second storage rate A2. The second storage rate A2 is lower than the first storage rate A1. The second storage rate A2 is a value at which electric power can be supplied from the battery 30 to the electric actuator 80 with a margin even in a case where the emergency electric power processing mode is set, and is set to, for example, 60%. In a case where it is determined that the storage rate A is lower than the second storage rate A2 (Yes in step S63), the control unit 44 proceeds to step S64 and determines that the battery 30 is required to be charged.

In a case where it is determined that the storage rate A is equal to or higher than the second storage rate A2 (No in step S63), the control unit 44 proceeds to step S65 and maintains the previous determination. That is, in a case where the storage rate A is brought into a state of being less than the first storage rate A1 (No in step S61), it is determined that the battery 30 is not required to be charged until the storage rate A is brought into to being lower than the second storage rate A2 (Yes in step S63). Therefore, in a case where it is temporarily determined that the battery 30 is not required to be charged, the determination that the battery 30 is not required to be charged is continued unless the storage rate A decreases to less than the second storage rate A2. When the storage rate A is brought into to being lower than the second storage rate A2 (Yes in step S63), it is determined that the battery 30 is required to be charged until the storage rate A is brought into to a state of being equal to or higher than the first storage rate A1 (Yes in step S61). Therefore, in a case where it is temporarily determined that the battery 30 is required to be charged, the determination that the battery 30 is required to be charged is continued unless the storage rate A recovers to the first storage rate A1 or higher.

FIG. 5 will be referred to again. In a case where it is determined that the battery 30 is required to be charged (Yes in step S60), the control unit 44 proceeds to step S70 and executes the constant current charging mode (the running electric power processing mode step and the constant current charging mode step). The control unit 44 controls the step-up/down converter 41 to charge the battery 30 with part of the generated electric power from the first DC power supply unit 10 via the power line L4. The rest of the generated electric power is supplied to the electric actuator 80. On the other hand, in a case where it is determined that charging of the battery 30 is unnecessary (No in step S60), the control unit 44 proceeds to step S80 and executes the power running assist mode (the running electric power processing mode step and the power running assist mode step). The control unit 44 controls the step-up/down converter 41 to supply the electric power stored in the battery 30 to the electric actuator 80 in addition to the electric power generated from the first DC power supply unit 10.

As described above, in a case where it is temporarily determined that the battery 30 is not required to be charged, the determination that the battery 30 is not required to be charged is continued unless the storage rate A decreases to lower than the second storage rate A2. That is, when the storage rate A of the battery 30 becomes equal to or higher than the first storage rate A1 (Yes in step S61 of FIG. 8), the power running assist mode is continued until the storage rate A becomes lower than the second storage rate A2 (Yes in step S63 of FIG. 8). As described above, in a case where it is temporarily determined that the battery 30 is required to be charged, the determination that the battery 30 is required to be charged is continued unless the storage rate A recovers to the first storage rate A1 or more. That is, in a case where the storage rate A of the battery 30 becomes lower than the second storage rate A2 (Yes in step S63 of FIG. 8), the constant current charging mode is continued until the storage rate A becomes equal to or higher than the first storage rate A1 (Yes in step S61 of FIG. 8).

In a case where it is determined that the voltage VL1 of the DC bus L1 is abnormal (No in step S10), the control unit 44 proceeds to step S90 and executes the emergency electric power processing mode. The control unit 44 controls the step-up/down converter 41 to supply the electric power from the battery 30 to the electric actuator 80 and to charge the battery 30 with the regenerative power from the electric actuator 80. In the emergency electric power processing mode, whether to supply power from the battery 30 to the electric actuator 80 or to charge the battery 30 with the regenerative power from the electric actuator 80 may switch therebetween by performing the same determination process as in step S20.

In a case where the electric power is released from the battery 30 during the execution of the emergency electric power processing mode, a voltage of the power line L2 is basically not more than the normal value (270 V) of the voltage VL1 of the DC bus L1. Therefore, in a case where the voltage VL1 of the DC bus L1 returns to the normal value (270 V), a current from the DC bus L1 is supplied to the second DC power supply unit 20 via the diode 50, and thus it is possible to transition promptly to the electric power processing mode during a normal operation.

Figure 9:
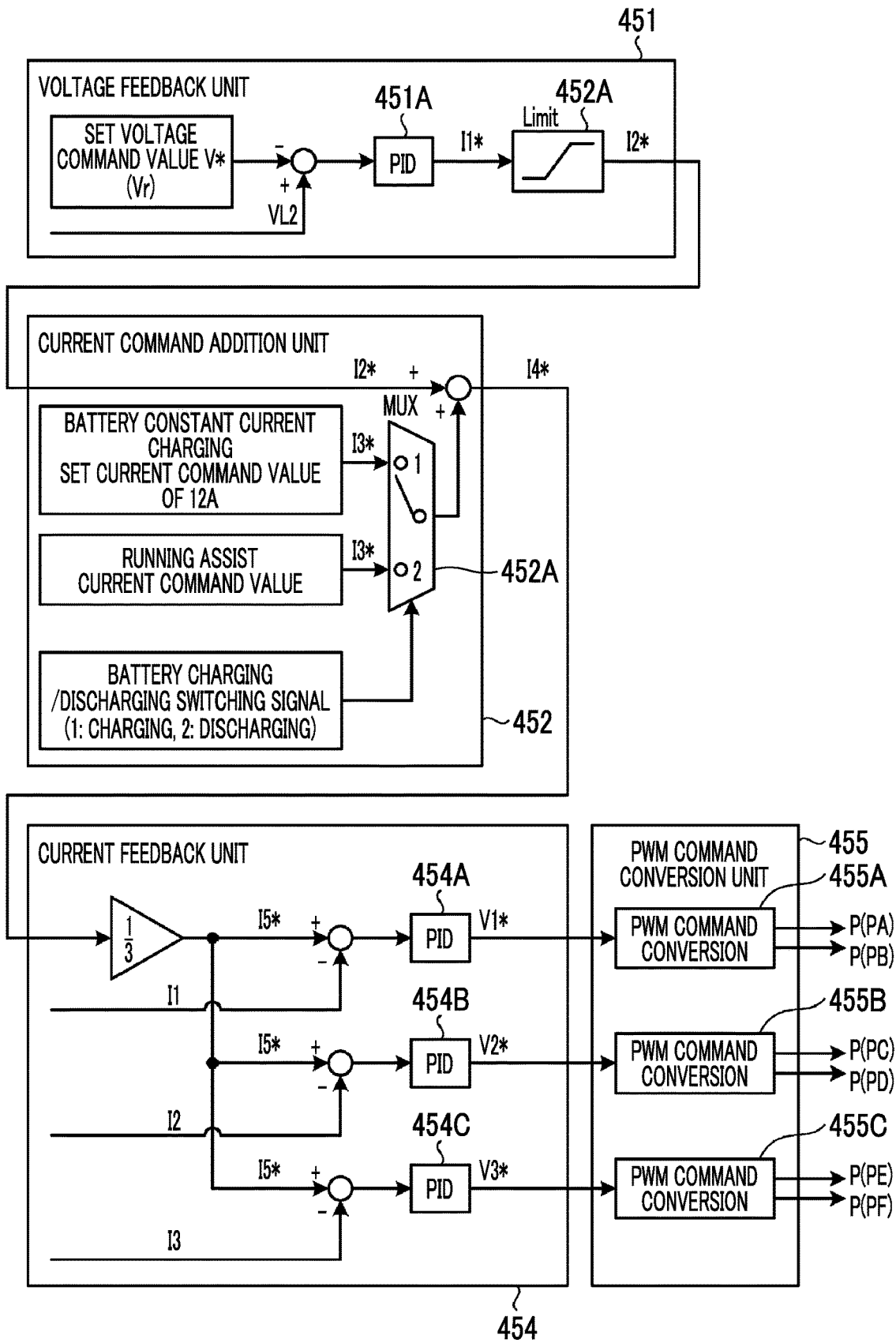
FIG. 9 is an explanatory diagram illustrating an example of a control block for the step-up/down converter during a normal operation in which a first DC power supply unit can be used normally.
Figure 10:
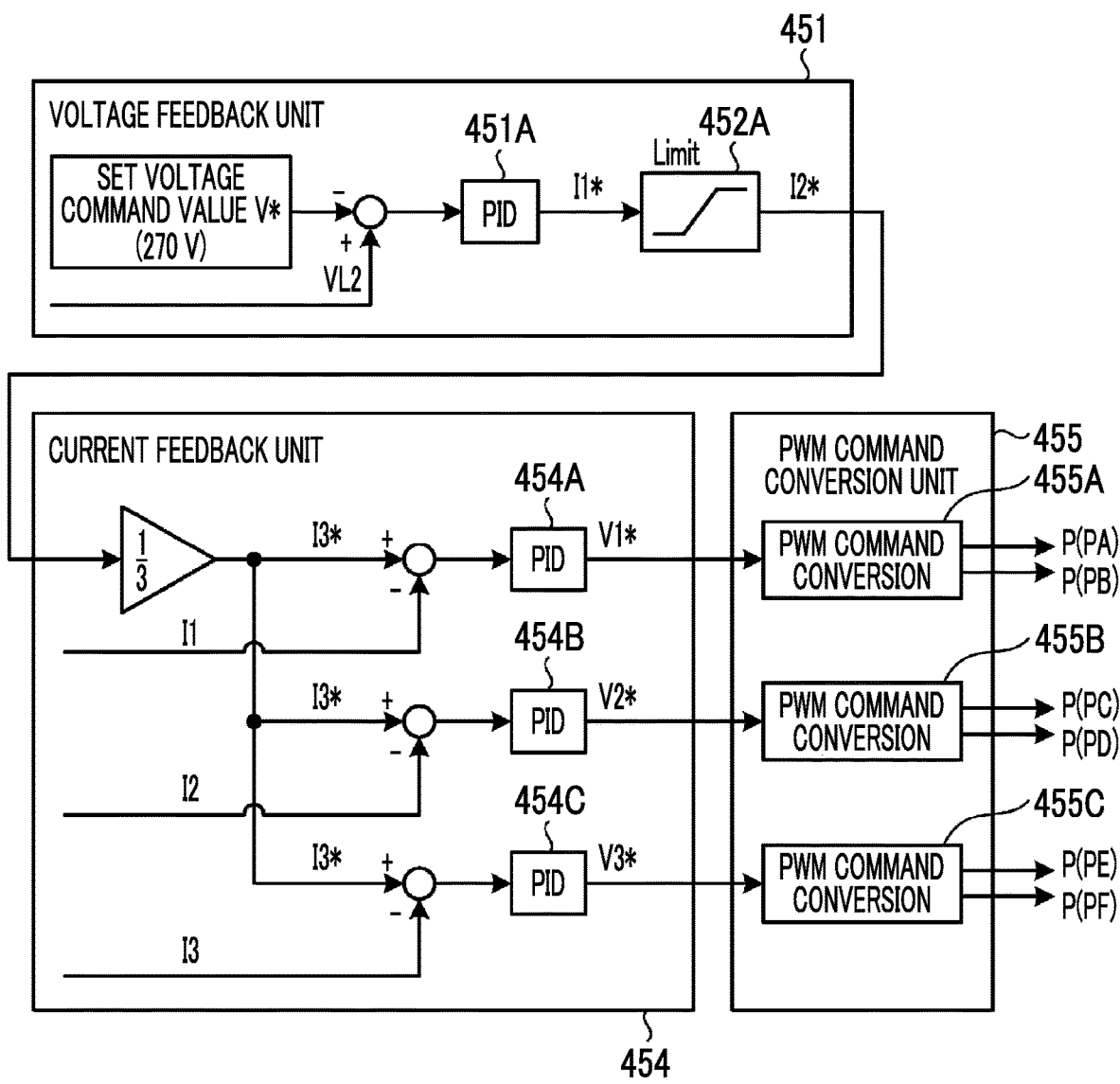
FIG. 10 is an explanatory diagram illustrating an example of a control block for the step-up/down converter during an emergency operation in which the first DC power supply unit cannot be used normally.

Next, an example of a specific control procedure for the step-up/down converter 41 will be described with reference to FIGS. 9 and 10. FIG. 9 is an explanatory diagram illustrating an example of a control block for the step-up/down converter during a normal operation in which the first DC power supply unit can be used normally, and FIG. 10 is an explanatory diagram illustrating an example of a control block for the step-up/down converter during an emergency operation in which the first DC power supply unit cannot be used normally. A series of processes illustrated in FIGS. 9 and 10 is repeatedly performed in every predetermined switching cycle (for example, 1/40 kHz) of the step-up/down converter 41.

With reference to FIG. 9, a description will be made of a control procedure for the step-up/down converter 41 during a normal operation, that is, in a case where it is determined that the voltage VL1 of the DC bus L1 is normal (Yes in step S10 of FIG. 5). The control unit 44 sets a voltage command V* of the power line L2 in a voltage feedback unit 451 to a preset threshold value Vr (275V in the present embodiment). Next, the control unit 44 calculates a difference (VL2−V*) between the set voltage command V* and the actual voltage VL2 of the power line L2 (equal to the voltage VL1 of the DC bus L1). The control unit 44 inputs the difference (VL2−V*) to a PID block 451A. The PID block 451A generates a current command value I1* by using a proportional gain, an integration time, and a derivative time that are set in advance. The control unit 44 inputs the generated current command value I1* to a Limit block 451B to limit the current command value I1*. Consequently, a limited current command value I2* is generated.

Next, the control unit 44 adds a current command value I3* that is a value of a charge/discharge current of the battery 30 required in the constant current charging mode and the power running assist mode, to the current command value I2* in a current command addition unit 452. When the constant current charging mode is executed (step S70 in FIG. 5), the control unit 44 outputs a 1:charging switching signal to a switching circuit 452A in the figure. The control unit 44 sets the current command value I3* to a predetermined constant current value (12 A in the present embodiment), and adds this value to the current command value I2* to generate a current command value I4*. On the other hand, when the power running assist mode is executed (step S80 in FIG. 5), the control unit 44 outputs a 2:discharge switching signal to the switching circuit 452A in the figure. The control unit 44 sets the current command value I3* to the current command value in the power running assist mode, and adds this value to the current command value I2* to generate the current command value I4*. The current command value I3* in the power running assist mode may be set according to electric power required by the electric actuator 80. Consequently, a charge/discharge current of the battery 30 in a case of executing the constant current charging mode and the power running assist mode can be set. In a case where the control unit 44 does not execute either the constant current charging mode or the power running assist mode, that is, in a case where the regenerative power processing mode is executed (step S30 in FIG. 5), the original current command value I2* is generated as the current command value I4* without adding the current command value I3* in this block. Consequently, a charge current of the battery 30 in a case where the regenerative power processing mode is executed can be set.

Next, the control unit 44 generates a current command value I5* that is ⅓ times the current command value I4* in a current feedback unit 454. This current command value I5* is a current command value at each phase of the step-up/down converter 41. The control unit 44 calculates differences (I5*–I1), (I5*–I2) and (I5*–I3) between the current command value I5* and current values I1, I2, and I3 at the respective phases of the step-up/down converter 41 detected by the current sensor 46 (refer to FIG. 3). The calculated differences (I5*–I1), (I5*–I2), and (I5*–I3) are input to PID blocks 454A, 454B, and 454C. The PID blocks 454A, 454B, and 454C generate voltage command values V1*, V2*, and V3* at the respective phases by using the preset proportional gain, integration time, and derivative time.

The control unit 44 inputs the voltage command values V1*, V2*, and V3* at the respective phases to PWM conversion command blocks 455A, 455B, and 455C in a PWM command conversion unit 455, to generate gate signals P (PA, PB, PC, PD, PE, and PF) at the respective phases. That is, the voltage command values V1*, V2*, and V3*, which are amplitudes of the voltage commands, are converted into the gate signals P that are pulse signals as times for turning on and off the respective switching elements 411 of the step-up/down converter 41. The generated gate signal PA is input to the switching element 411A. The gate signal PB is input to the switching element 411B. The gate signal PC is input to the switching element 411C. The gate signal PD is input to the switching element 411D. The gate signal PE is input to the switching element 411E. The gate signal PF is input to the switching element 411F.

By repeatedly executing the above processes in predetermined switching cycles, each switching element 411 of the step-up/down converter 41 is controlled turned on and off in a predetermined switching cycle on the basis of each gate signal P. As a result, charging and discharging of the battery 30 can be controlled during a normal operation in correspondence to the power running assist mode, the constant current charging mode, and the regenerative power processing mode.

With reference to FIG. 10, a description will be made of a control procedure for the step-up/down converter 41 in order to supply the electric power of the battery 30 to the electric actuator 80 during an emergency operation, that is, in a case where it is determined that the voltage VL1 of the DC bus L1 is abnormal (No in step S10 of FIG. 5). As illustrated in FIG. 10, the control unit 44 sets the voltage command V* of the power line L2 in the voltage feedback unit 451 to the voltage VL2 (equal to the voltage VL1 of the DC bus L1) (270 V, in the present embodiment) during a normal operation. Next, the control unit 44 calculates a difference (VL2–V*) between the set voltage command V* and the actual voltage VL2 (equal to the voltage VL1 of the DC bus L1). The control unit 44 inputs the difference (VL2–V*) to a PID block 451A. The PID block 451A generates a current command value I1* by using a proportional gain, an integration time, and a derivative time that are set in advance. The control unit 44 inputs the generated current command value I1* to a Limit block 451B to limit the current command value I1*. Consequently, a limited current command value I2* is generated.

Next, the control unit 44 generates the current command value I3* that is ⅓ times the current command value I2* in the current feedback unit 454. This current command value I3* is a current command value at each phase of the step-up/down converter 41. The control unit 44 calculates differences (I3*–I1), (I3*–I2), and (I3*–I3) between the current command value I3* and the current values I1, I2, and I3 at the respective phases of the step-up/down converter 41 detected by the current sensor 46 (refer to FIG. 3). The calculated differences (I3*–I1), (I3*–I2), and (I3*–I3) are respectively input to the PID blocks 454A, 454B, and 454C. The PID blocks 454A, 454B, and 454C generate voltage command values V1*, V2*, and V3* at the respective phases by using the preset proportional gain, integration time, and derivative time.

The control unit 44 inputs the voltage command values V1*, V2*, and V3* at the respective phases to PWM conversion command blocks 455A, 455B, and 455C in a PWM command conversion unit 455, to generate gate signals P (PA, PB, PC, PD, PE, and PF) at the respective phases. That is, the voltage command values V1*, V2*, and V3*, which are amplitudes of the voltage commands, are converted into the gate signals P that are pulse signals as times for turning on and off the respective switching elements 411 of the step-up/down converter 41. The generated gate signal PA is input to the switching element 411A. The gate signal PB is input to the switching element 411B. The gate signal PC is input to the switching element 411C. The gate signal PD is input to the switching element 411D. The gate signal PE is input to the switching element 411E. The gate signal PF is input to the switching element 411F.

By repeatedly executing the above processes in predetermined switching cycles, each switching element 411 of the step-up/down converter 41 is controlled turned on and off in a predetermined switching cycle on the basis of each gate signal P. As a result, discharging of the battery 30 can be controlled during an emergency operation, and the battery 30 can be charged with the regenerative power even in a case where the regenerative power is generated by the electric actuator 80.

As described above, the power distribution system 100 according to the embodiment includes the first DC power supply unit 10 that has the generator 11 and is connected to the DC bus L1, the power lines L2 and L3 connected to the DC bus L1 and the electric actuator 80, the battery 30 connected to the power line L2, the step-up/down converter 41 that controls charging and discharging of the battery 30, the voltage sensor 43 that detects the presence or absence of regenerative power supplied from the electric actuator 80 to the power line L2, the second DC power supply unit 20 having the control unit 44 that controls the step-up/down converter 41, and the diode 50 that cuts off a current flowing from the second DC power supply unit 20 to the DC bus L1. When the voltage sensor 43 does not detect the regenerative power, the control unit 44 executes the running electric power processing mode in which generated electric power that is generated by the first DC power supply unit 10 is supplied to the electric actuator 80 via the DC bus L1 and the power lines L2 and L3 while charging and discharging the battery 30 such that the storage rate A of the battery 30 is maintained within a predetermined range by the step-up/down converter 41. When the voltage sensor detects the regenerative power, the control unit 44 executes the regenerative power processing mode in which the battery 30 is charged with the regenerative power by the step-up/down converter 41.

With this configuration, in the power distribution system 100 and the power distribution method according to the embodiment, the regenerative power generated by the electric actuator 80 is processed to be stored in the battery 30 without using the first DC power supply unit 10 having the generator 11 as a power source. Therefore, it is possible to improve the processing responsiveness of the regenerative power and cope with the steep generation of the regenerative power. By cutting off a current flowing from the second DC power supply unit 20 to the DC bus L1 with the diode 50, a voltage of the DC bus L1 does not fluctuate during processing of the regenerative power. In a case where the electric actuator 80 does not generate regenerative power, that is, in a case where the electric actuator 80 is supplied with electric power, the battery 30 is charged and discharged such that the storage rate A is maintained within a predetermined range. As a result, when the regenerative power is generated by the electric actuator 80, it is possible to suppress that the regenerative power cannot be processed or the battery 30 is overcharged because the storage rate A of the battery 30 is too high. Therefore, according to the power distribution system 100 and the power distribution method according to the embodiment, the regenerative power generated by the electric actuator 80 can be processed in a stable manner with good responsiveness, and the voltage fluctuation of the DC bus L1 can be prevented during the processing of the regenerative power.

In the running electric power processing mode, in a case where the storage rate A is equal to or higher than the first storage rate A1, the control unit 44 continues the power running assist mode in which electric power from the battery 30 is supplied to the electric actuator 80 in addition to the generated electric power until the storage rate becomes lower than the second storage rate A2 that is lower than the first storage rate A1, and in a case where the electric power storage rate A is lower than the second storage rate A2, continues the constant current charging mode (charging mode) in which part of the generated electric power is stored in the battery 30 until the storage rate becomes equal to or higher than the first storage rate A1.

With this configuration, the storage rate A of the battery 30 can be maintained within a predetermined range between the first storage rate A1 and the second storage rate A2 while the electric power is being supplied to the electric actuator 80. As a result, when the regenerative power is generated by the electric actuator 80, it is possible to suppress that the regenerative power cannot be processed or the battery 30 is overcharged because the storage rate A of the battery 30 is too high. The storage rate A of the battery 30 can be sufficiently maintained, and electric power can be supplied from the battery 30 to the electric actuator 80 with a margin. In a case where the storage rate is equal to or higher than the first storage rate A1, the power running assist mode is continued until the storage rate becomes lower than the second storage rate A2, and in a case where the storage rate is lower than the first storage rate A1, the constant current charging mode is continued until the storage rate becomes equal to or higher than the second storage rate A2. Consequently, it is possible to prevent frequent switching between the power running assist mode and the constant current charging mode.

The control unit 44 executes the emergency electric power processing mode in which electric power is exchanged between the battery 30 and the electric actuator 80 while the battery 30 is charged and discharged by the step-up/down converter 41 when the first DC power supply unit 10 cannot be used normally, that is, when the voltage VL1 of the DC bus L1 is less than the predetermined threshold value Vr.

With this configuration, even in a case where electric power cannot be exchanged between the first DC power supply unit 10 and the electric actuator 80, electric power can be supplied from the second DC power supply unit 20 to the electric actuator 80 and regenerative power from the electric actuator 80 can be processed by the second DC power supply unit 20. As described above, since the storage rate A of the battery 30 is maintained within a predetermined range while supplying electric power from the first DC power supply unit 10 to the electric actuator 80, it is possible to prevent the electric power from the battery 30 from being insufficient in the emergency electric power processing mode.

When the voltage sensor 43 is brought into a state of not detecting regenerative power during execution of the regenerative power processing mode, the control unit 44 continues the regenerative power processing mode until a predetermined standby time elapses, and transitions to the running electric power processing mode (the power running assist mode or the constant current charging mode) in a case where the state in which the voltage sensor 43 does not detect the regenerative power continues for a predetermined standby time.

In a case where the regenerative power is continuously generated from the electric actuator 80 even when the voltage of the power line L2 temporarily drops and the voltage sensor 43 does not detect the regenerative power due to execution of the regenerative power processing mode, a voltage of the power line L2 may rise again. In this case, when transition to the running electric power processing mode (the power running assist mode or the constant current charging mode) occurs every time the voltage of the power line L2 drops, there is a possibility that the regenerative power processing mode and the running electric power processing mode may frequently switch therebetween. According to the configuration of the present embodiment, since switching to the running electric power processing mode is not performed until the predetermined standby time elapses, it is possible to reduce frequent switching between the regenerative power processing mode and the running electric power processing mode (the power running assist mode or the constant current charging mode). In the present embodiment, waiting for elapse of a predetermined standby time is performed when switching from the regenerative power processing mode to the power running assist mode or the constant current charging mode, but only when switching from the regenerative power processing mode to the power running assist mode, waiting for the elapse of a predetermined standby time may be performed.

The second DC power supply unit 20 has the overcurrent cutoff circuit 42 that cuts off a connection with the electric actuator 80 when a current with a predetermined value or more flows for a predetermined time or more.

With this configuration, for example, when a short circuit occurs on the electric actuator 80 side, it is possible to suppress an overcurrent from flowing into the power distribution system 100 and suppress a voltage drop in the DC bus L1.

In the second DC power supply unit 20, a plurality of electric actuators 80 are connected in parallel to the power line L2, and the overcurrent cutoff circuit 42 is provided in correspondence to each of the electric actuators 80.

With this configuration, part of regenerative power generated by one electric actuator 80 can be supplied to another electric actuator 80. As a result, it is possible to reduce an electric power loss that may occur in the step-up/down converter 41 and when charging the battery 30 compared with a case where the battery 30 is charged with the whole of the regenerative power, and thus it is possible to improve the electric power efficiency. Particularly, in the emergency electric power processing mode, in a case where there is the electric actuator 80 that is not required to be driven, when the corresponding overcurrent cutoff circuit 42 is turned off, the electric power is suppressed from being supplied from the battery 30 to the electric actuator 80. Therefore, it is possible to suppress a decrease in the storage rate A of the battery 30.

In the present embodiment, when the voltage VL1 of the DC bus L1 is less than the predetermined threshold value Vr, it is determined that the first DC power supply unit 10 cannot be used normally. As described above, by monitoring the voltage VL1 of the DC bus L1 on the anode side of the diode 50, the normality of the first DC power supply unit 10 and transition to the emergency electric power processing mode can be easily determined. However, whether or not the first DC power supply unit 10 can be used normally may be determined on the basis of a value of a current flowing through the cathode side of the diode 50, that is, the power line L2. Consequently, it is not necessary to monitor a voltage between the DC bus L1 and the second DC power supply unit 20, and thus the power distribution system 100 can be simplified.

In the present embodiment, each power distribution section 1 is provided with one first DC power supply unit 10 and one second DC power supply unit 20, but in order to ensure redundancy, a spare first DC power supply unit 10 and second DC power supply unit 20 may be provided separately.

In the present embodiment, the presence or absence of regenerative power supplied from the electric actuator 80 to the power line L2 is detected by the voltage sensor 43 that detects the voltage VL2 of the power line L2. However, the presence or absence of regenerative power may be detected by, for example, a current sensor that detects a value of a current flowing through the power line L2.

REFERENCE SIGNS LIST 1, 1L, 1R Power distribution section
10 First DC power supply unit
11 Generator
12 PWM converter
13, 14, 43 Voltage sensor
15 Primary power distribution controller
20 Second DC power supply unit
30 Battery
40 Secondary power distribution controller
41 Step-up/down converter
411 Switching element
42 Overcurrent cutoff circuit
44 Control unit
16, 46, 48 Current sensor
50 Diode
80 Electric actuator
90 Electric power apparatus
100 Power distribution system
L1 DC bus
L2, L3, L4 Power line

The invention claimed is:

1. A power distribution system that is mounted on an aircraft and distributes electric power to an electric actuator of the aircraft, the power distribution system comprising:
a first DC power supply unit that has a generator and is connected to a DC bus;
a second DC power supply unit that has a power line connected to the DC bus and the electric actuator, a power storage device connected to the power line, a charge/discharge control circuit controlling charging and discharging of the power storage device, a detection sensor detecting the presence or absence of regenerative power supplied from the electric actuator to the power line, and a control unit controlling the charge/discharge control circuit; and
a diode that cuts off a current flowing from the second DC power supply unit to the DC bus, wherein
when the detection sensor does not detect the regenerative power, the control unit executes a running electric power processing mode in which generated electric power that is generated by the first DC power supply unit is supplied to the electric actuator via the DC bus and the power line while charging and discharging the power storage device such that a storage rate of the power storage device is maintained within a predetermined range by the charge/discharge control circuit, and
when the detection sensor detects the regenerative power, the control unit executes a regenerative power processing mode in which the power storage device is charged with the regenerative power by the charge/discharge control circuit.

2. The power distribution system according to claim 1, wherein
in the running electric power processing mode, in a case where the storage rate is equal to or higher than a first storage rate, the control unit continues a power running assist mode in which electric power from the power storage device is supplied to the electric actuator in addition to the generated electric power until the storage rate becomes lower than a second storage rate that is lower than the first storage rate, and in a case where the storage rate is lower than the second storage rate, the control unit continues a charging mode in which the power storage device is charged with part of the generated electric power until the storage rate becomes equal to or higher than the first storage rate.

3. The power distribution system according to claim 1, wherein
when the first DC power supply unit cannot be used normally, the control unit executes an emergency electric power processing mode in which electric power is exchanged between the power storage device and the electric actuator while the power storage device is charged and discharged by the charge/discharge control circuit.

4. The power distribution system according to claim 1, wherein
when the detection sensor is brought into a state of not detecting the regenerative power during execution of the regenerative power processing mode, the control unit continues the regenerative power processing mode until a predetermined standby time elapses, and transitions to the running electric power processing mode in a case where the state in which the detection sensor does not detect the regenerative power continues for a predetermined standby time.

5. The power distribution system according to claim 1, wherein
the second DC power supply unit includes an overcurrent cutoff circuit that cuts off a connection with the electric actuator when a current with a predetermined value or more flows for a predetermined time or more.

6. The power distribution system according to claim 5, wherein
in the second DC power supply unit, a plurality of electric actuators are connected in parallel to the power line, and
the overcurrent cutoff circuit is provided in correspondence to each of the electric actuators.

7. A power distribution method of distributing electric power from a power distribution system that is mounted on an aircraft to an electric actuator of the aircraft, the power distribution system including a first DC power supply unit that has a generator and is connected to a DC bus, a second DC power supply unit that has a power line connected to the DC bus and the electric actuator, a power storage device connected to the power line, a charge/discharge control circuit controlling charging and discharging of the power storage device, and a detection sensor detecting the presence or absence of regenerative power supplied from the electric actuator to the power line, and a diode that cuts off a current flowing from the second DC power supply unit to the DC bus, the power distribution method comprising:

supplying, when the detection sensor does not detect the regenerative power, generated electric power that is generated by the first DC power supply unit to the electric actuator via the DC bus and the power line while charging and discharging the power storage device such that a storage rate of the power storage device is maintained within a predetermined range by the charge/discharge control circuit; and charging, when the detection sensor detects the regenerative power, the power storage device with the regenerative power by the charge/discharge control circuit.

* * * * *